(12) United States Patent
Nahum et al.

(10) Patent No.: US 12,371,087 B2
(45) Date of Patent: Jul. 29, 2025

(54) SYSTEM FOR IMMOBILIZING A MEDICAL ROBOT

(71) Applicant: Quantum Surgical, Montpellier (FR)

(72) Inventors: Bertin Nahum, Castelnau-le-Lez (FR); Fernand Badano, Lyons (FR); Lucien Blondel, Montpellier (FR); Estelle Pescher, Montpellier (FR)

(73) Assignee: Quantum Surgical, Montpellier (FR)

( * ) Notice: Subject to any disclaimer, the term of this patent is extended or adjusted under 35 U.S.C. 154(b) by 621 days.

(21) Appl. No.: 17/435,300

(22) PCT Filed: Feb. 28, 2020

(86) PCT No.: PCT/FR2020/050404
§ 371 (c)(1),
(2) Date: Aug. 31, 2021

(87) PCT Pub. No.: WO2020/178511
PCT Pub. Date: Sep. 10, 2020

(65) Prior Publication Data
US 2022/0153364 A1    May 19, 2022

(30) Foreign Application Priority Data

Mar. 1, 2019  (FR) ...................................... 1902154

(51) Int. Cl.
*B62D 57/032*     (2006.01)
*B62B 5/04*       (2006.01)

(52) U.S. Cl.
CPC .................... *B62B 5/049* (2013.01)

(58) Field of Classification Search
CPC ............................. B62D 57/032; A61B 34/30
See application file for complete search history.

(56) References Cited

U.S. PATENT DOCUMENTS

| 2,324,415 | A |   | 7/1943 | Moss |       |
|-----------|---|---|--------|------|-------|
| 5,094,311 | A | * | 3/1992 | Akeel | ................. B65G 35/00 |
|           |   |   |        |      | 414/744.5 |

(Continued)

FOREIGN PATENT DOCUMENTS

| CA | 2055486 C | 11/1996 |
| CN | 101612053 A | 12/2009 |

(Continued)

OTHER PUBLICATIONS

International Search Report for PCT/FR2020/050404, dated Aug. 18, 2020, 3 pages.

*Primary Examiner* — Vishal R Sahni
(74) *Attorney, Agent, or Firm* — ARENTFOX SCHIFF LLP (57) ABSTRACT

The invention concerns a system for immobilizing a mobile device, such as a medical assistance robot, comprising: a linkage mechanism connecting at least three feet to one another and intended to be fixed to the chassis of the mobile device, said linkage mechanism being adapted to drive the feet sliding in respective guides intended to be fixed to the chassis of the mobile device, an actuator connected to the linkage mechanism so as to move the feet between a position bearing against the floor in which the immobilization system is able to immobilize the mobile device and a retracted position in which the immobilization system is able to release the mobility of the mobile device.

20 Claims, 3 Drawing Sheets

(56) References Cited

U.S. PATENT DOCUMENTS

| | | |
|---|---|---|
| 2004/0065341 A1 | 4/2004 | La Fauci |
| 2006/0026762 A1 | 2/2006 | Hornbach et al. |
| 2006/0161136 A1 | 7/2006 | Anderson et al. |
| 2008/0218948 A1* | 9/2008 | Lai ....................... H05K 5/0234 361/724 |
| 2010/0187782 A1 | 7/2010 | Facey et al. |

FOREIGN PATENT DOCUMENTS

| | | |
|---|---|---|
| CN | 102988109 A | 3/2013 |
| CN | 105284629 A | 2/2016 |
| CN | 105411678 A | 3/2016 |
| CN | 108290596 A | 7/2018 |
| DE | 202012010230 U1 | 10/2013 |
| EP | 0666209 A1 | 8/1995 |
| EP | 1621171 A1 | 2/2006 |
| FR | 3043970 A1 | 5/2017 |
| GB | 2440802 A | 2/2008 |
| JP | 2017128142 A | 7/2017 |
| WO | 9107922 A1 | 6/1991 |
| WO | 2018055621 A1 | 3/2018 |

* cited by examiner

SYSTEM FOR IMMOBILIZING A MEDICAL ROBOT

CROSS-REFERENCE TO RELATED APPLICATIONS:

This application is a National Phase of PCT/FR2020/050404, filed on Feb. 28, 2020, which claims priority to French Patent Application No. 1902154, filed on Mar. 1, 2019, the disclosures of which are hereby incorporated by reference in their entireties.

TECHNICAL FIELD OF THE INVENTION

The present invention lies in the field of equipment for mobile devices, for example trolleys or other vehicles. The invention concerns in particular a system for immobilizing a mobile device.

The invention is particularly suitable for immobilizing a medical assistance robot.

PRIOR ART

Mobile devices, such as trolleys or other vehicles intended to carry a load, generally include immobilization means adapted to immobilize them.

Known immobilization means consist in a shoe able to bear against a wheel of the device so as to apply a friction force to the wheel of sufficient intensity to prevent its rotation.

However, for some applications, for example in the field of medical assistance robots in which the immobilization of the mobile device is particularly important, this type of immobilization means is not satisfactory.

In fact, robot-based medical assistance devices are typically used to improve the precision of the gesture of the operator and/or to carry out a treatment directly on a patient by means of a robot-based arm carrying a medical instrument. It is therefore essential for the safety of the patient that, during the treatment, the mobile device is immobilized and stabilized in an effective manner, any unwanted movement of said device risking causing movement of the robot-based arm and therefore of the medical instrument that it carries.

The document FR3043970 describes a robot-based medical assistance device provided with castors that can be immobilized via bearing shoes adapted to be driven to pivot by a mechanism connecting said shoes to a lever actuated manually by an operator.

These immobilization means have in particular the advantage that their efficacy depends directly on the intensity of the rubbing of the bearing shoes on the floor. That intensity is liable to vary greatly as a function of the nature of the materials of the shoe and the floor. The immobilization of the mobile device may therefore not be sufficient.

Furthermore, the deployment of the immobilization means is entirely dependent on the operator. There is therefore a risk of the operator forgetting to actuate the immobilization means before a treatment.

Another disadvantage of the means for immobilizing the robot-based medical assistance device described in the document FR3043970 lies in the fact that they necessitate a floor of perfect flatness to function optimally. The mechanism connecting the shoes to the lever prevents any movements of one shoe relative to another such that if the floor has flatness defects they do not bear on the floor or do not all bear on the floor with the same bearing force.

DESCRIPTION OF THE INVENTION

An objective of the present invention is to alleviate the aforementioned disadvantages by proposing a system for immobilizing a mobile device supported by wheels, for example a medical assistance robot. The immobilization system comprises at least three mobile feet sliding in respective guides intended to be fixed to a chassis of the mobile device, a linkage mechanism connecting the feet to one another and being intended to be fixed to said chassis of the mobile device, and an actuator able to solicit the linkage mechanism to move the feet to slide between a position bearing against the floor in which the immobilization system is able to immobilize the mobile device and a retracted position in which the immobilization system is able to free the mobility of the mobile device.

In other words, the linkage mechanism is adapted to drive the feet sliding in the guides between their bearing and retracted positions when it is solicited by the actuator.

These features enable easy and successive activation and deactivation of the system, that is to say immobilizing and freeing the mobility of the mobile device simply and rapidly.

In particular embodiments the invention further has the following features separately or in any technically operative combination.

In particular embodiments of the invention the immobilization system comprises at least one elastic member solicited when the feet are in the bearing position. Said at least one elastic member is sized to support a predetermined fraction of the total weight of the mobile device when it is solicited.

In other words, the elastic member is configured to be solicited so as to support only a predetermined fraction of the total weight of the mobile device when the feet are in the bearing position.

A fraction of this kind represents only a part of the total weight of the mobile device. The predetermined fraction is preferably between 30 and 75% inclusive of the total weight of the mobile device. The predetermined fraction is more preferably between 45 and 60% inclusive of the total weight of the mobile device. By way of example, for a mobile device weighing approximately 150 kg, the predetermined fraction will be approximately 80 kg.

As a result, the weight of the mobile device is partly supported by the immobilization system when said mobile device is immobilized.

This feature contributes to guaranteeing the stability of the mobile device when it is immobilized. Furthermore, should one of the feet be damaged, the mobile device would still be supported by its wheels, which remain in contact with the floor at all times, which makes it possible to ensure the stability of said device in the event of a fault.

In particular embodiments of the invention, the immobilization system comprises at least one sensor configured to determine the position of the feet, said sensor or sensors being connected to a control unit configured to control the actuator as a function of that information.

Thus the immobilization system can be automated.

A feature of this kind advantageously makes it possible to prevent all risk of the operator forgetting to actuate the immobilization system.

In particular embodiments of the invention, the linkage mechanism includes at least three sets of links articulated to one another, each set of links being configured to connect a foot with the chassis of the mobile device. The linkage mechanism further includes at least one bar rigidly connected to at least one crossmember, said bar and said crossmember connecting the sets of links and the actuator, solicitation of the actuator causing rotation of the links of each set of links relative to one another and sliding off the feet in the guides.

In other words, each set of links is configured so that when its links are driven to pivot relative to one another it causes sliding movement of the foot to which it is connected.

The rod and the crossmember connect the actuator to the sets of links so that on each solicitation of the actuator said rod and said crossmember cause pivoting of the links of each set of links and therefore sliding of the feet in the guides.

Here the term "set of links" defines a set of two links articulated to one another.

In particular embodiments of the invention, each of the respective ends of the rod and the crossmember is connected to a set of links by a pivot connection the rotation axis of which is coaxial with the rotation of axis of the links of said set of links relative to one another.

The forces are therefore uniformly distributed over each link of the set of links on each solicitation of the actuator.

In particular embodiments of the invention, the actuator is an electric cylinder.

Thanks to this feature, the actuator is not reversible. Furthermore, an actuator of this kind moves very precisely. Finally, an electric actuator has the advantage of necessitating only an electrical power supply to function.

In particular embodiments of the invention the immobilization system comprises a member for disengaging the actuator adapted to occupy:

a coupling state in which it provides a mechanical connection between the chassis of the mobile device and the linkage mechanism via the actuator; this is so that said actuator is able to apply mechanical forces to the linkage mechanism, and a disengaged state in which it breaks said mechanical connection; this is so that no mechanical force can be transmitted by the actuator to the linkage mechanism Thus, depending on whether the disengagement member is in the coupling state or the disengaged state, the actuator is able or not able to act on the feet to drive them between their retracted and bearing positions.

This feature is particularly advantageous if the immobilization system has to be used when the actuator is not functional, for example if it has malfunctioned or is no longer supplied with energy.

In embodiments of the invention, the immobilization system comprises an elastic return member soliciting the linkage mechanism to drive the feet into their retracted position.

In other words, the feet are solicited from their retracted position by an elastic member acting on the linkage mechanism and more particularly on the rod and the crossmember.

Thus when the disengagement member is in the disengaged state the elastic return member solicits systematic return of the feet to their retracted position.

This feature is particularly advantageous if the actuator is not reversible. In fact, the immobilization system can be deactivated manually, which renders it independent of an energy supply, for example an electrical, pneumatic or hydraulic energy supply, in the event of a malfunction.

In particular embodiments of the invention, the feet include a suspended part and a bearing part in sliding relationship with one another, said suspended and bearing parts being urged away from one another by an elastic member.

Thanks to these features, each foot is individually adapted to compensate locally any flatness defects of the floor, that is to say bumps and hollows, so that the chassis of the device is supported in a substantially horizontal manner.

The bearing part of each foot is preferably adapted to slide in the guide and the suspended part is preferably adapted to slide in the bearing part.

Thanks to the elastic member, these features also make it possible to be able to support only part and not the entirety of the weight of the mobile device so that even if a foot is damaged the mobile device will be stabilized in that it is supported by its wheels.

In particular embodiments of the invention, each foot comprises at least one end of travel abutment for sliding of the suspended and bearing parts relative to one another, formed by a pin fixed to one of said suspended or bearing parts engaged through an opening in the other suspended or bearing part.

In particular embodiments of the invention each foot comprises a member for measuring local defects in the flatness of the floor adapted to determine if there exists a local defect of flatness of the floor facing said foot and to determine the size of that local defect, said measuring member being configured to transmit to the control unit:

a setpoint authorizing control of the actuator when the value of the size of the local defect, termed the "measured value", is in a predefined tolerance range, and a setpoint prohibiting control of the actuator when the measured value is outside the predefined tolerance range.

Thus, thanks to this feature, the stability of the mobile device is assured during its immobilization.

For example, this kind of measuring member may be an ultrasound sensor fixed in the base of each foot and directed so as to measure the distance between said base and the surface of the floor that it faces. That measured distance is then compared to a predefined theoretical distance from the floor in order to determine the existence and the dimension of a possible defect of flatness of the floor. The theoretical distance from the floor is the distance between the base of the foot in the retracted position and a plane tangential to at least three wheels of the mobile device.

In particular embodiments of the invention, each foot comprises a safety member communicating to the control unit information representing a value of movement of the foot when the feet are in the bearing position. The value of the movement depends in particular on the type of sensor used and its arrangement in the foot.

The control unit deduces on the basis of this information a value termed the "control value" representing the dimension of a local defect of flatness of the floor compensated by said foot. Said control unit is configured to control the actuator to drive the feet into the retracted position and to transmit an alert signal to the mobile device if the control value is not substantially identical to the measured value.

The term "substantially identical" means that a small tolerance range is allowed corresponding to mechanical play and the accuracy of the sensor used.

This feature adds an additional level of safety in the use of the immobilization system.

In particular embodiments of the invention each foot comprises a force sensor connected to the control unit and configured to determine the weight supported by each of said feet when they are in the bearing position, the control unit being configured to emit an alert signal if the weight supported by a foot is below a target value.

These features make it possible to determine if the mobile device is insufficiently stable when it is immobilized, for example because one of the feet is located over too large a local defect or flatness to be compensated or because the elastic member is damaged.

According to another aspect, the present invention concerns a mobile device, in particular a medical assistance robot, characterized in that it comprises a chassis to which is connected an immobilization system as described above, the chassis being supported at a distance from the floor by at least three wheels.

BRIEF DESCRIPTION OF THE FIGURES

The invention will be better understood on reading the following description given by way of nonlimiting example and with reference to the figures, which show.

In these figures reference numbers identical from one figure to another designate identical or analogous elements. Furthermore, for reasons of clarity, the drawings are not to scale unless otherwise indicated.

DESCRIPTION OF EMBODIMENTS

Figure 1:
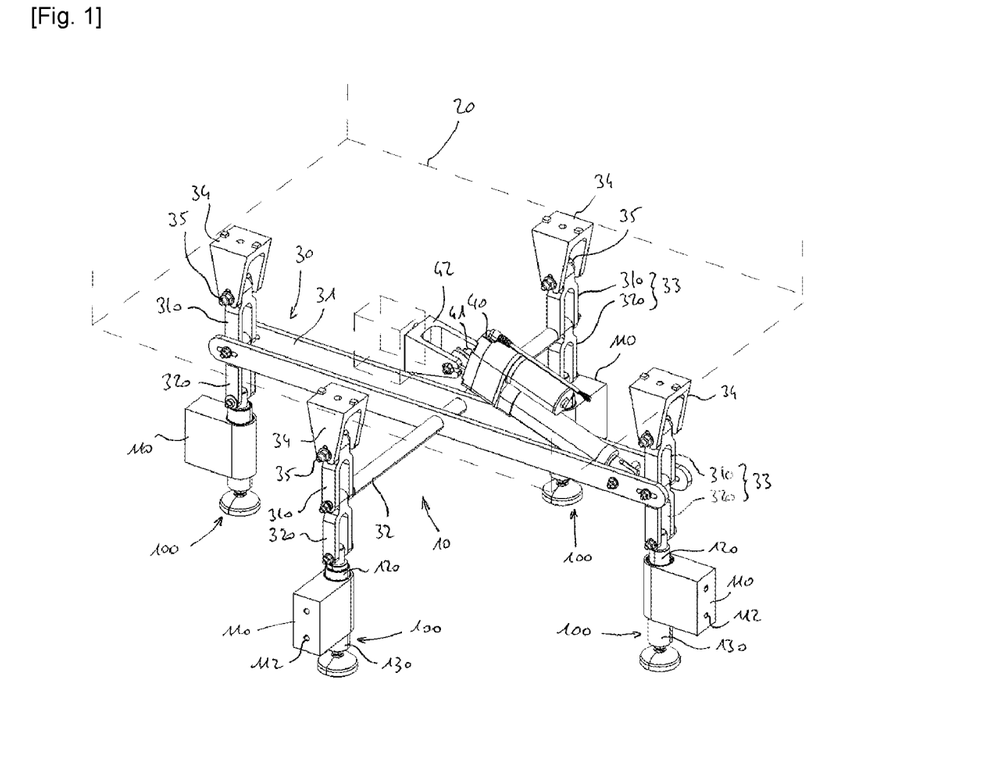
FIG. 1 a perspective view of the immobilization system of a mobile device fixed to the chassis of the mobile device represented in dashed line.

The present invention concerns a system 10 for immobilizing a mobile device 20 one embodiment of which is shown in the FIG. 1 perspective view in. In FIG. 1 the mobile device 20 is partly and diagrammatically represented in dashed line.

The invention finds a preferred application in a context in which the mobile device 20 is a medical assistance robot.

It is furthermore particularly suited to immobilizing said medical assistance robot when it occupies an optimum position relative to a position of a patient for carrying out a medical treatment and to releasing the mobility of said robot when the treatment is finished.

The immobilization system 10 is intended to be fixed to the chassis of the mobile device 20 supported by at least three, preferably four wheels (not shown).

The immobilization system 10 is configured to occupy a state in which it immobilizes the mobile device 20 and supports only a part of its weight, whilst guaranteeing its stabilization, and a state in which it allows movement of said device.

The immobilization system 10 comprises feet 100 intended to be connected to the chassis by way of a linkage mechanism 30.

An actuator 40 is connected to the linkage mechanism 30 so as to transmit forces to the feet 100 to cause them to move between a position bearing on the floor and a retracted position at a distance from the floor.

When the feet 100 are in the position bearing on the floor they are intended to support a predetermined fraction of the weight of the mobile device 20 so as to immobilize it and when they are in the retracted position they are intended to free the mobility of the mobile device 20.

When they move, the feet 100 advantageously slide in guides 110 adapted to be fixed to the chassis of the mobile device 20. These guides 110 enable retention of the feet 100 such that they have only one degree of freedom of movement in translation.

In other words, the linkage mechanism 30 is configured to transform the movement of the actuator 40 into movement in translation of the feet 100.

As FIG. 1 shows, the linkage mechanism 30 includes a rod 31 extending between two longitudinal ends and to which is fixed the crossmember 32 also extending between two longitudinal ends.

The rod 31 is preferably formed by two parallel arms, formed by structural sections for example, the two parallel arms being arranged symmetrically and at a distance from one another, as FIG. 1 shows.

Each of the longitudinal ends of the rod 31 and of the crossmember 32 is connected to a foot 100 by a movement transmission assembly. The movement transmission assemblies are configured to transform any movement of the rod 31 and of the crossmember 32 into movement in translation of the feet 100.

To balance the forces exerted on the feet 100, the crossmember 32 is preferably fixed to the rod 31 equidistantly from the two longitudinal ends of said crossmember 32 and, likewise, equidistantly between the two longitudinal ends of the rod 31.

In the embodiment of the invention represented in FIGS. 1 to 6 the immobilization system 10 comprises four feet 100 but in other embodiments the system may comprise at least three feet 100.

Each movement transmission assembly comprises a set of links 33 articulated on the one hand to the foot 100 and on the other hand to the chassis of the mobile device 20 by a fixing member.

The fixing member more particularly connects a link of the set of links 33 to the chassis of the mobile device 20, preferably allowing one degree of freedom in rotation. For example, as FIG. 1 shows, the fixing member is formed by a yoke 34 rigidly fixed to the chassis and comprising a pin 35 by which said yoke 34 is fixed to a link in a freely rotatable manner.

Each set of links 33 has two links extending between a link head an link foot, the links being respectively termed the "upper link" 310 and the "lower link" 320 in the remainder of the text.

It should be noted that in the present description the term "vertical" is defined in accordance with a direction that is parallel to the direction of gravity and that the relative terms "upper" and "lower" are defined along a vertical straight line segment and are relative to the position of an immobilization system 10 according to the invention as shown in FIG. 1.

The upper links 310 and the lower links 320 of a set of links 33 are articulated to one another, the foot of the upper link 310 being connected to the head of the lower link 320 by a pivot termed the "set of links pivot".

Each set of links 33 is such that the upper link 310 is connected to the pin 35 of the yoke 34 by its head and the foot of the lower link 320 is articulated to one end of a foot 100.

Each of the longitudinal ends of the rod 31 and of the crossmember 32 is advantageously connected to a set of links 33. Each longitudinal end of the rod 31 and of the crossmember 32 is more particularly connected to a set of links 33 by a pivot connection the rotation axis of which is coaxial with the axis of the set of links pivot.

As can be seen in FIG. 1, the set of links pivot of the sets of links 33 connected to the ends of the rod 31 is arranged between said two parallel arms, as are the upper links 310 and lower links 320 of said set of links.

In the embodiment of the invention represented in FIG. 1 the actuator 40 is connected on the one hand to the rod 31 and on the other hand to the chassis so as to drive the rod 31 and the crossmember 32 in circular movement in translation about rotation axes of the link head of the upper links 310. In other words, the actuator 40 is configured to drive the rod 31 and the crossmember 32 to transmit to each upper link 310, via its head, a rotation movement about the pin 35 of the yoke 34.

Alternatively, instead being connected to the rod 31, the actuator 40 may be connected to the crossmember 32.

The effect of movement transmission of this kind is to drive the rotation of the lower link 320 about the set of links pivot 33 so that the upper links 310 and the lower links 320 can be inclined or aligned relative to one another.

This consequently brings about bushing or pulling of each foot 100 through the guide 110 in which it is free to slide in the direction of rotation of the lower link 320.

The feet 100 and the guides 110 are preferably configured so that said feet 100 slide along a substantially vertical axis so that the resultant of the force generated by the weight of the mobile device 20 to be supported, applied by each foot 100 against the floor, is entirely vertical. This feature makes it possible to guarantee the stability of the mobile device 20 during its immobilization and to eliminate all risks of the feet 100 slipping.

An advantage of the present invention lies in the fact that when the feet 100 are in the bearing position the upper link 310 and the lower link 320 of each set of links 33 are in line with the foot 100 with which they are associated, as FIG. 1 shows, the resultant of the force generated by the weight of the mobile device 20 to be supported applied to each foot 100 is entirely vertical. As well as reducing the intensity of the mechanical stresses to which the actuator 40 is subjected, this feature enables the immobilization system 10 to ensure high stability of the mobile device 20 when it is in immobilized, in that all risk of slipping is eliminated.

The actuator 40 is preferably arranged relative to the rod 31 so that the resultant of the forces that it applies to said rod 31 is substantially horizontal.

In the present embodiment of the invention the actuator 40 is advantageously a cylinder, preferably an electric cylinder.

The cylinder comprises a rod adapted to move in translation in an actuator body. In the present embodiment the rod is fixed so as to be mobile in rotation about a shaft termed the "support shaft" 41 cooperating with a yoke termed the "support yoke" 42 intended to be rigidly fixed to the chassis. The body of the cylinder is fixed to a pivot arranged transversely between the two parallel arms of the rod 31 so as to be mobile in rotation relative to said rod 31.

However, the cylinder body and rod may equally well be fixed either to the support shaft 41 or to the rod 31.

For reasons of mechanical strength, the support yoke 42 is preferably fixed to the chassis so as to rest bearing against a vertical surface of said chassis. In fact, thanks to this feature, the fixing elements of the support 42 fixing it to the chassis will be subjected to tension and compression forces and not to shear forces.

The immobilization system 10 may advantageously comprise a member 36 for disengaging the actuator 40 adapted to occupy:
- a coupling state in which it provides a mechanical connection between the chassis of the mobile device 20 and the linkage mechanism 30 via the actuator 40 so that said actuator 40 is able to apply mechanical forces to the linkage mechanism 30, and
- a disengaged state in which it breaks said mechanical connection so that no mechanical force can be transmitted by the actuator 40 to the linkage mechanism 30.

The disengagement member 36 is more particularly adapted to detach the actuator 40 from the chassis and/or from the linkage mechanism 30.

This feature is particularly advantageous if the immobilization system 10 must be used when the actuator 40 is not functional, for example if it has malfunctioned or is no longer supplied with energy.

The disengagement member 36 is preferably formed by a rod 360 one of the ends of which takes the form of a pin intended to be engaged in the support yoke 42 when the disengagement member 36 is in the coupling state to produce a mechanical connection between the chassis of the mobile device 20 and the actuator 40 in a manner analogous and alternative to the support shaft 41 described above.

Figure 4:
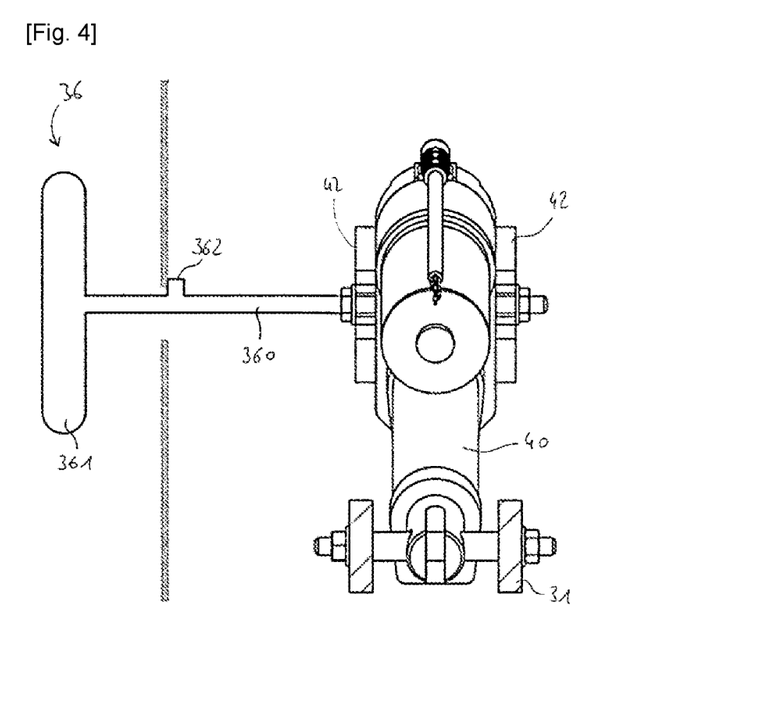
FIG. 4 a diagrammatic detail view of a disengagement member of the actuator.

The other end of the rod 360 includes a manoeuvring element 361, for example a handle, a hand lever or a handwheel, as shown diagrammatically in FIG. 4, intended to be manipulated by an operator to change the state of the disengagement member 36.

The rod 360 extends through an opening in the support part intended to be fixed to the chassis of the mobile device 20. The support part is advantageously adapted to guide the rod 360 in movement in translation and in rotation along and about its longitudinal axis.

The rod 360 includes a radial abutment 362 resting against the support part when the disengaging member 36 is in the coupling state so as to maintain the pin engaged in the support yoke 42. This radial abutment 362 makes it possible to guarantee retention of the disengaged member 36 in the coupling state and to prevent any accidental change of state.

The opening in the support part more particularly comprises a radial clearance with a section of the same shape as that of the radial abutment 362 and dimensions at least equal to those of the section of said radial abutment 362. This is so that, when the radial abutment 362 is facing the clearance, it is able to slide through said clearance, consequently allowing sliding of the rod 360 along its longitudinal axis.

By pulling on the rod 360 via the manoeuvring element 361, a feature of this kind enables disengagement of the pin from the support yoke 42 and therefore driving of the disengaging member 36 in the disengaged state.

To summarize, to drive the disengaging member 36 from its coupling state to its disengaged state, an operator has to pivot said member until the radial abutment 362 is disposed facing the clearance and then to pull on the rod 360 until the pin is withdrawn from the support yoke 42.

Conversely, to drive the disengaging member 36 from its disengaged state to its coupling state, the operator has to position the actuator 40, in particular the free end of the rod of the cylinder, facing the support yoke 42 and to push the rod 360 along its longitudinal axis so as to engage the pin both in the support yoke 42 and in the free end of the rod of the cylinder, and then to pivot said rod 360 so as to press the radial abutment 362 against the support part.

Figure 2:
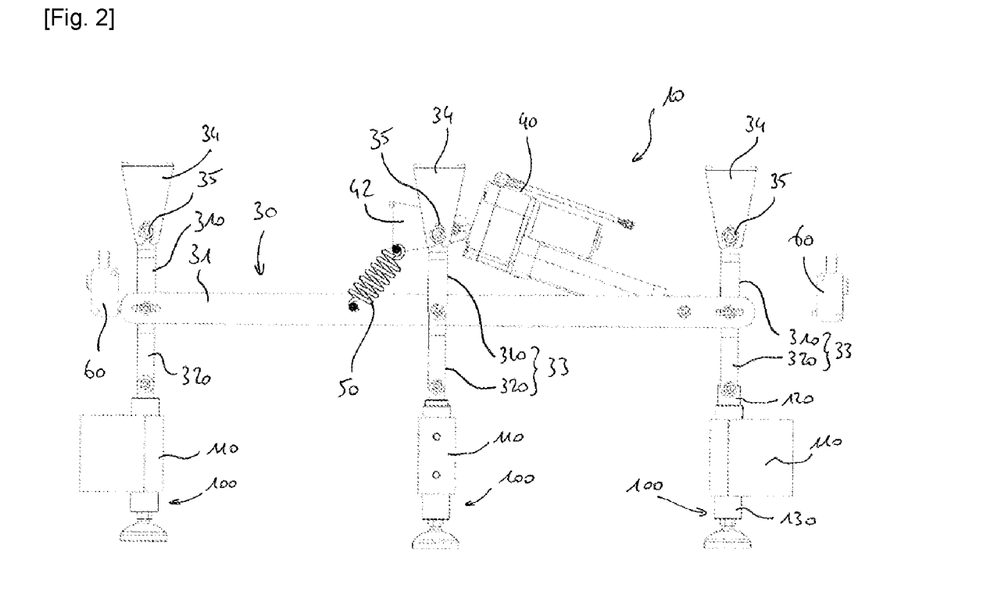
FIG. 2 a side view of an immobilization system according to FIG. 1, the feet being in the bearing position.
Figure 3:
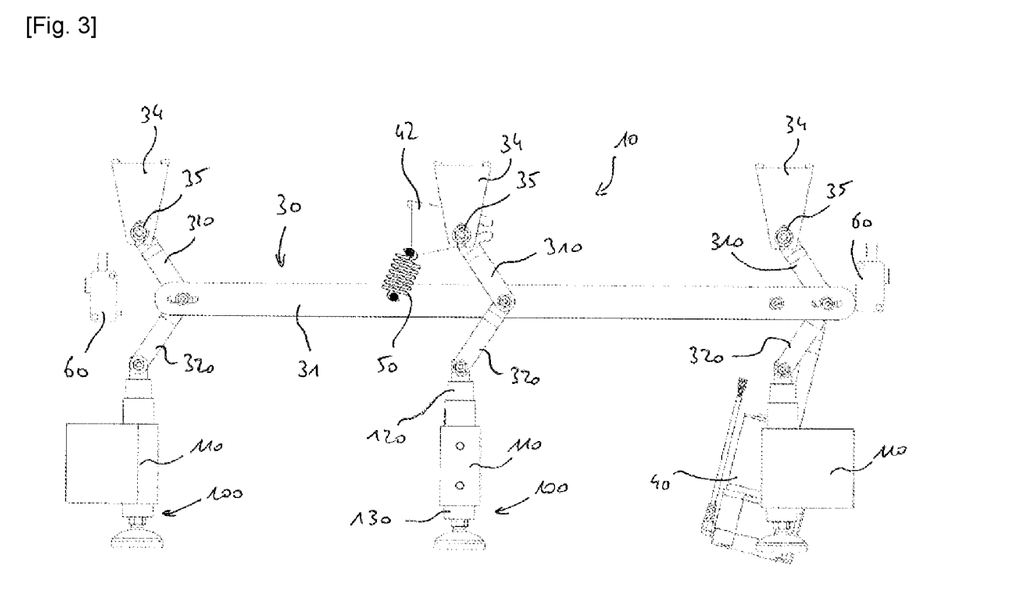
FIG. 3 a side view of an immobilization system according to FIG. 1, the feet being in the retracted position and the actuator being separated from the chassis.

FIGS. 2 and 3 show an elastic return member 50 adapted to solicit the linkage mechanism 30 to drive the feet 100 into their retracted position. To be more precise, the elastic return member 50 may be formed by a tension coil spring fixed on the one hand to the rod 31 and on the other hand to the chassis of the mobile device 20, for example, by means of the support yoke 42.

Thus when the actuator 40 is detached from the chassis by the removal of the disengaging member 36, the feet 100 are systematically driven into their retracted position by the elastic return member 50.

This feature is particularly advantageous when the actuator 40 is not reversible.

The immobilization system 10 preferably includes a control unit connected to the actuator 40 so as to be able to control it, in particular to deploy or to retract the rod of the cylinder, in accordance with instructions supplied by the user or if predefined setpoints are indicated.

In the present embodiment, the control unit of the immobilization device 10 is preferably intended to be connected to a central control unit of the mobile device 20 and is preferably adapted to control the actuator 40 in accordance with setpoints supplied by the latter.

The central control unit of the mobile device 20 is more particularly configured, depending on requirements, to transmit an immobilization setpoint to the control unit of the immobilization system 10 to control the actuator 40 so as to immobilize the mobile device 20 or to transmit a release setpoint to the control unit of the immobilization system 10 to control the actuator 40 so as to free the mobility of said mobile device 20.

The control unit of the immobilization system 10 may advantageously be controlled by the central control unit of the mobile device 20 so that when the mobile device 20 is positioned in a predetermined zone in accordance with a treatment plan said central control unit, at the command of an operator or automatically, transmits to the control unit a control setpoint of the actuator 40 to immobilize the mobile device 20. Conversely, when immobilization of the mobile device is no longer required the central control unit, at the command of an operator or automatically, transmits to the control unit a control setpoint for the actuator 40 to free the mobility of the mobile device 20. The mobile device 20 can then be moved.

The immobilization system 10 may advantageously comprise one or more sensors connected to the control unit and adapted to determine the position of the feet 100. The control unit is configured so as to control the actuator 40 to interrupt the movement of the feet 100 when a sensor has determined that the feet 100 are in the bearing position or in the retracted position.

The sensors may be sensitive to the movement of any part of the linkage mechanism 30. As FIGS. 2 and 3 show, these sensors may more particularly be end of travel sensors 60 adapted to be solicited when the rod 31, the crossmember 32 or the upper link 310 or the lower link 320 is in one of two extreme positions respectively corresponding to positions in which the feet 100 are in the retracted position and in the bearing position.

In this case the end of travel sensors 60 are mechanical, magnetic, electrical, pneumatic or optical position sensors.

In the embodiment represented in FIGS. 2 and 3 the end of travel sensors 60 are arranged on the chassis of the mobile device 20 on respective opposite sides of the rod 31, substantially in line with its length, so that when said rod 31 is in one of its extreme positions each of its longitudinal ends actuates said sensors.

Alternatively, the immobilization system 10 includes a sensor sensitive to the movement of the actuator 40. This sensor may more particularly be a potentiometer cooperating with the actuator 40 to determine its travel continuously. The potentiometer is therefore adapted to determine when the actuator 40 has driven the rod 31 into one of its two extreme positions and consequently the position of the feet 100.

Figure 5:
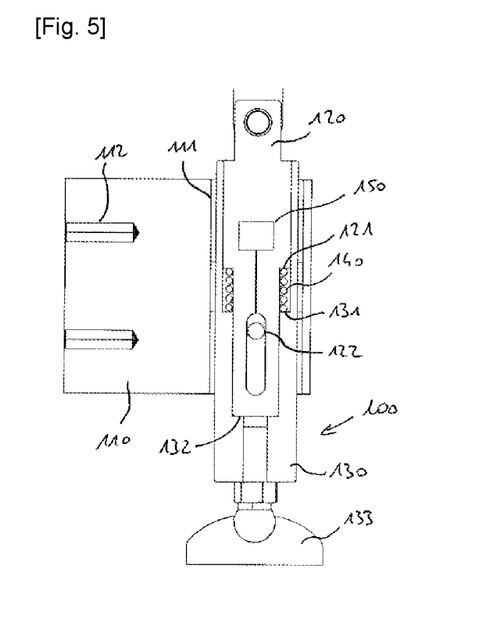
FIG. 5 a sectional view of a foot of an immobilization system according to FIG. 1, the foot being in the bearing position and compensating a local defect of flatness of the floor.
Figure 6:
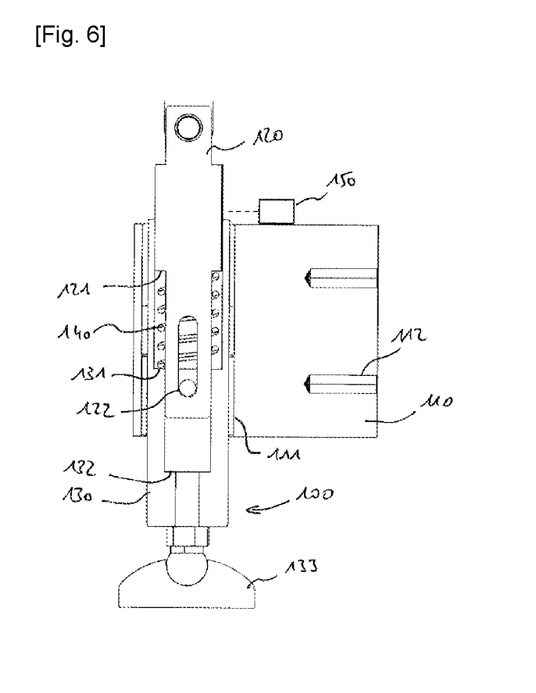
FIG. 6 a sectional view of a foot of an immobilization system according to FIG. 1, the foot moving toward a retracted position.

FIGS. 5 and 6 represent a sectional view of one of the feet 100 of the immobilization system 10 respectively in a retracted position and in a bearing position.

Each foot 100 comprises a suspended part 120 in sliding relationship with a bearing part 130, the parts being urged away from one another by an elastic member 140.

The suspended part and the bearing part 130 are preferably mobile in translation relative to one another along a vertical axis.

The suspended part 120 extends between an upper end and a lower end.

The suspended part 120 has at its upper end a pivot by which it is connected to the foot of the lower link 320.

In the present embodiment the suspended part 120 has a cross section of circular shape and comprises within its length two portions the diameters of which are different so as to form a shoulder termed the "first shoulder" 121. To be more precise, the suspended part 120 has, over a segment of its length extending as far as its lower end, a smaller diameter portion termed the "lower portion".

In the present embodiment the bearing part 130 extends between an upper end and a lower end and has a hollow tubular shape the cross section of which is circular. The bearing part 130 has an opening at its upper end in which is slidably engaged the suspended part 120.

The bearing part 130 preferably comprises within its length two portions the inside diameters of which are different so as to form a shoulder termed the "second shoulder" 131. To be more precise, the bearing part 130 has over a segment of its length extending between its lower and upper ends a portion termed the "lower portion" the inside diameter of which substantially corresponds, apart from mechanical clearances, to the diameter of the lower portion of the suspended part 120 so that said lower portions slidingly cooperate with one another.

As FIGS. 5 and 6 show, the suspended part 120 and the bearing part 130 are configured so that the first and second shoulders 121 and 131 are face to face and form an internal chamber of annular shape around the lower portion of the suspended part 120.

FIGS. 5 and 6 show that the elastic member 140 is arranged in the internal chamber. The elastic member 140 preferably consists of a compression coil spring wound around the smaller section portion of the suspended part 120 and arranged to bear against the first and second shoulders 121 and 131.

In conjunction with the elastic member 140 the mobility of the suspended part 120 relative to the bearing part 130 advantageously enables the immobilization system 10 to support only a part of the weight of the mobile device 20 when it is immobilized.

To this end each elastic member 140 is sized so as to be able to support a target value of the weight of the mobile device 20 when the foot 100 is in the bearing position.

For example, the feet 100 being four in number, each elastic member 140 is calibrated so as to support 25% of the predetermined fraction of the weight of the mobile device when the latter is immobilized. It goes without saying that, if the immobilization system includes three feet 100, the target value corresponds to 33% of the predetermined fraction of the weight of the mobile device 20 when the latter is immobilized.

Thus if a foot is damaged the mobile device 20 remains stable because it continues to be supported by its wheels. This feature therefore contributes to guaranteeing the stability of the mobile device when it is immobilized.

Furthermore, thanks to the mobility of the suspended part 120 relative to the bearing part 130 and to the elastic member 140, each foot 100 locally compensates any local flatness defects of the floor, of hollow or bump type, so that the chassis of the mobile device 20 is supported in a substantially horizontal manner and all of the feet 100 bear on the floor despite possible local flatness defects. The stability of the immobilized mobile device 20 is therefore assured.

In other words, the suspended part 120 being more or less engaged in the bearing part 130, depending on any local flatness defects of the floor, the yokes are systematically at the same level relative to the floor, so that the mobile device 20 is maintained at the same level.

The "local flatness defects of the floor" concept is understood here as meaning any offset of the surface of the floor relative to the plane in which are inscribed the zones or points in or at which the wheels of the mobile device 20 bear on the floor.

Each foot 100 is sized so that the maximum travel of the suspended part 120 in the bearing part 130 enables compensation of the flatness defect of the floor and makes it possible to support a target value corresponding to a percentage of the predetermined fraction of the total weight of the mobile device when the feet are in the bearing position. The maximum travel of the suspended part 120 in the bearing part 130 is for example approximately twenty millimetres when the immobilization system supports 80 kg of a 150 kg mobile device and compensates a maximum offset of five millimetres.

Here the maximum travel is defined between a state of maximum compression of a foot 100 and a state of maximum extension. A foot 100 is in such a state a when it locally compensates a local defect in the flatness of the floor, respectively a bump and a hollow. The bumps and hollows that each foot 100 is able to compensate have for example an offset of five millimetres relative to a plane in which are inscribed the zones or points in or at which the wheels of the mobile device 20 bear on the floor.

Each foot 100 comprises a compression end of travel abutment 132 formed in the present embodiment by an end wall at the level of the lower end of the bearing part 130 against which the lower end of the suspended part 120 can rest when the foot 100 is in the bearing position and a local defect in the flatness of the floor is compensated, as FIG. 5 shows.

Each foot 100 also comprises an extension end of travel abutment 122 formed in the present embodiment by a pin fixed radially inside the lower portion of the bearing part 130, as FIG. 6 shows. The pin is engaged in an opening, for example of oblong shape, extending axially in the lower portion of the suspended part 120.

As FIGS. 5 and 6 show, the lower end of the bearing part 130 of each foot 100 has a base 133 adapted to rest against the floor when the feet 100 are in the bearing position. The base 133 can advantageously be joined to said lower end by a ball-joint connection to adapt to possible local deformations of the floor.

FIGS. 5 and 6 also show that in one embodiment of the invention the guides 110 have a body including a through-bore 111 and means 112 for fixing it to the chassis. The bearing part 130 of each foot 100 is preferably engaged in the through-bore 111 of a guide 110 with which it cooperates, for example by sliding in smooth bearings.

Each foot 100 preferably comprises a member for measuring local flatness defects of the floor (not shown in the figures) adapted to determine if there exists a local flatness defect of the floor with regard to said foot 100 and to determine the size of that local defect.

The members for measuring local defects in the flatness of the floor are more particularly adapted to determine if there is an offset between the position of the floor facing each foot 100 relative to a predefined theoretical position of the floor.

For example, this kind of measuring member may be an ultrasound sensor the operation of which is known as such to the person skilled in the art. Each ultrasound sensor may be fixed into the base 133 of a foot 100 and directed so as to measure the distance between said base 133 and the surface of the floor that it faces.

The measured distance is compared to the theoretical distance to the floor to determine the size of the local defect, termed the "measured value". The measured value is compared to a value representing a maximum dimension of the local defect of flatness of the floor that can be corrected by each foot of the immobilization system, and this maximum dimension corresponds to one limit of a tolerance range referred to hereinabove.

This kind of measuring member is intended to be used when the feet 100 are in the retracted position.

The measurement member is moreover configured to transmit to the control unit:
 a setpoint allowing control of the actuator 40 when the value of dimension of the local defect termed the "measured value" is in a predefined tolerance range, and
 a setpoint prohibiting control of the actuator 40 when the measured value is outside the predefined tolerance range.

Each foot 100 preferably comprises a safety member 150 adapted to verify if the distance the foot 100 moves when the feet slide between a retracted position and a bearing position corresponds to the distance measured by the measuring member between the base 133 and the surface of the floor when the feet are in the retracted position.

In an embodiment of the invention represented in FIG. 6 the safety member 150 is formed by a linear optical encoder. The linear optical encoder comprises an optical module fixed to the guide 110 and adapted to generate a light beam (represented by a dashed line) directed onto a rule (represented by a thick line) fixed to the suspended part 120 facing said optical module.

The encoder is therefore able to measure the movement of the suspended part 120 relative to the guide 110 and is configured to transmit this information to the control unit which deduces from it the value of the size of the local defect in flatness of the floor when compensated, termed the "control value". In a variant embodiment the control unit may be intended to communicate said control value to the central control unit of the mobile device 20 which deduces from it the value of the size of the compensated local flatness defects of this floor.

Alternatively, the safety member 150 is formed by an inductive movement sensor, as shown in FIG. 5. The sensor includes a measurement module integrated into an internal volume formed in the suspended part 120, above the opening, and a rod extending axially in a bore from said measurement module as far as the pin. Thus the rod is adapted to slide in the bore during movement of the pin in the opening.

Consequently, the inductive movement sensor is able to measure the movement of the suspended part 120 relative to the bearing part 130 and is configured to transmit that information to the control unit which deduces from it the size of the local defect of flatness of the floor when compensated, termed the "control value". In a variant embodiment the control unit may be intended to communicate said control value to the central control unit of the mobile device 20 which deduces from it the size of the local defect of flatness of the floor when compensated.

If the size of the local defect of flatness of the floor actually compensated is substantially identical to the measured value the mobile device 20 is immobilized in a stable manner.

Conversely, if the size of the local defect of flatness of the floor actually compensated is not substantially identical to the measured value the mobile device 20 is immobilized in a unstable manner.

The control unit of the immobilization system 10 is configured so that if the control value does not correspond to, that is to say is not substantially identical to, the measured value it controls the actuator 40 to free the mobility of the mobile device 20 and transmits an alert signal to the central control unit of the said mobile device 20.

The control unit of the immobilization system 10 is also configured so that, in the contrary situation, if the control value corresponds to the measured value it allows immobilization of the mobile device 20.

Furthermore, the control unit is configured to control the actuator 40 to free the mobility of the mobile device 20 and to transmit an alert signal to the central control of the mobile device 20 if the end of travel abutments in extension and in compression of one of the feet 100 are solicited, that is to say if one of the feet 100 is at the maximum compression or the maximum extension. These situations represent too great a local defect of flatness of the floor to be able to be compensated, therefore implying that the mobile device 20 is not immobilized or is not immobilized in a stabilized manner.

For example, the end travel abutments may more particularly comprise mechanical position switch type sensors changing state when said end of travel abutments are solicited. The control unit is connected to these sensors in order to determine their state.

Alternatively, other types of sensors may be used, such as a potentiometer associated with the rod of the cylinder and connected to the control unit.

Furthermore, each foot 100 comprises a force sensor connected to the control unit and configured to determine the weight supported by each of said feet 100 when they are in the bearing position.

The control unit of the immobilization system 10 is configured so that if the weight supported by a foot 100 is less than a target value it controls the actuator 40 to free the mobility of the mobile device 20 and transmits an alert signal to the central control unit of said mobile device 20.

The target value is equal to a percentage of the predetermined fraction of the weight of the device as a function of the number of feet 100 of the immobilization system 10.

For example, if the immobilization system 10 includes four feet 100 the target value is equal to 25% of the predetermined fraction of the weight of the mobile device 20 when the latter is immobilized. It goes without saying that, if the immobilization system includes three feet 100, the target value corresponds to 33% of the predetermined fraction of the weight of the mobile device 20 when the latter is immobilized.

These features make it possible to determine if the mobile device 20 is insufficiently stable when it is immobilized, for example because one of the feet 100 is above a local defect of flatness that is too large to be compensated or because the elastic member 140 is damaged.

More generally, it is to be noted that the embodiments and uses of the invention considered hereinabove have been described by way of nonlimiting example and consequently that other variants may be envisaged.

In particular, in other types of embodiment, there is nothing to exclude considering an alternative arrangement of the linkage mechanism 30 in which said mechanism comprises a rod 31 to each of the ends of which is fixed a crossmember 32, the feet 100 being connected to the ends of the crossmembers 32.

More generally, there is nothing to exclude other types of arrangements of the linkage mechanism 30, in particular of the rod(s) 31 and crossmember(s) 32.

The invention claimed is:

1. A system for immobilizing a mobile device comprising:
at least three mobile feet capable of sliding in respective guides, said guides coupled to a chassis of the mobile device,
a linkage mechanism connecting the at least three mobile feet to one another and coupled capable of being fixed to the chassis of the mobile device, and
an actuator configured to actuate the linkage mechanism to move the at least three mobile feet to slide between a position bearing against a floor in which the system is able to immobilize the mobile device and a retracted position in which the system is able to free the mobility of the mobile device;
wherein the linkage mechanism includes at least three sets of links articulated to one another, each set of links of the at least three sets of links being configured to connect one of the at least three mobile feet with the chassis of the mobile device, the linkage mechanism further comprising at least one bar rigidly connected to at least one crossmember, said at least one bar and said at least one crossmember connecting each of the sets of links of the at least three sets of links and the actuator, wherein actuation of the actuator causes rotation of the links of each set of links of the at least three sets of links relative to one another and thereby sliding of the feet in the guides, wherein a first end of the actuator is coupled to the at least one bar or the at least one crossmember and a second end of the actuator is coupled to the chassis.

2. The system of claim 1, comprising at least one elastic member that is actuated when the at least three mobile feet are in the bearing position, said at least one elastic member being sized to support a predetermined fraction of the total weight of the mobile device when the at least one elastic member is actuated.

3. The system of claim 1, comprising at least one sensor configured to determine the position of the at least three mobile feet, said one or more sensors being connected to a control unit configured so as to control the actuator as a function of this information.

4. The system of claim 1, in which each of the respective ends of the at least one bar and the at least one crossmember is connected to the at least three sets of links by a pivot connection, the rotation axis of which is coaxial with the rotation of axis of the links of said set of links of the at least three sets of links relative to one another.

5. The system of claim 1, wherein the actuator is an electric cylinder.

6. The system of claim 1, further comprising a member for disengaging the actuator adapted to occupy:
  a coupling state in which the member for disengaging the actuator provides a mechanical connection between the chassis of the mobile device and the linkage mechanism via the actuator, said actuator being able to apply mechanical forces to the linkage mechanism, and
  a disengaged state in which the member for disengaging the actuator breaks said mechanical connection, no mechanical force being transmissible by the actuator to the linkage mechanism.

7. The system of claim 6, further comprising an elastic return member configured to actuate the linkage mechanism to drive the at least three mobile feet into their retracted position.

8. The system of claim 1, in which the at least three mobile feet include a suspended part and a bearing part in sliding relationship with one another, said suspended and bearing parts being urged away from one another by an elastic member.

9. The system of claim 8, in which each of the at least three mobile feet comprises at least one end of travel abutment for sliding of the suspended and bearing parts relative to one another, formed by a pin fixed to one of said suspended or bearing parts engaged through an opening in the other suspended or bearing part.

10. The system of claim 3, wherein each of the at least three mobile feet comprises a member for measuring local defects in the flatness of the floor, determining if there exists a local flatness defect of the floor facing said foot and the size of that local defect, said measuring member being configured to transmit to the control unit:
  a setpoint authorizing control of the actuator when the value of the size of the local defect, termed the "measured value", is in a predefined tolerance range, and
  a setpoint prohibiting control of the actuator when the measured value is outside the predefined tolerance range.

11. The system of claim 10, wherein each of the at least three mobile feet comprises a safety member communicating to the control unit representative information of a value of movement of the the at least three mobile feet when the at least three mobile feet slide between a retracted position and a bearing position, and in which the control unit deduces on the basis of this information a value termed the "control value" representing the size of a local flatness defect of the floor compensated by said at least three mobile feet, said control unit being configured to control the actuator to drive the at least three mobile feet into the retracted position and to transmit an alert signal to the mobile device if the control value is not substantially identical to the measured value.

12. The system of claim 3, wherein each of the at least three mobile feet comprises a force sensor connected to the control unit and determining the weight supported by each of said at least three mobile feet when they are in the bearing position, the control unit being configured to emit an alert signal if the weight supported by a particular foot of the at least three mobile feet is below a target value.

13. A mobile device comprising a chassis connected to the system of claim 1, wherein the chassis is being supported at a distance from the floor by at least three wheels.

14. The system of claim 1, wherein the at least one bar includes at a first arm and a second arm, optionally wherein the first arm is parallel to the second arm . . .

15. The system of claim 14, wherein at least one of the sets of links is coupled between the first arm and the second arm.

16. The system of claim 14, wherein the actuator includes a piston including a rod pivotably coupled to the chassis and a cylinder pivotally coupled between the first arm and the second arm.

17. The system of claim 1, wherein the at least one bar includes a first end and a second end and wherein the at least one cross member includes a first end and the second end, and wherein the at least one bar is coupled to the at least one cross member at a position that is equidistant between the first and second ends of the at least one bar and the first and second ends of the at least one cross member.

18. The system of claim 6, further comprising a locking feature configured to maintain the member for disengaging the actuator in the coupling state.

19. A system for immobilizing a mobile device comprising:
  at least three mobile feet capable of sliding in respective guides, said guides coupled to a chassis of the mobile device,
  a linkage mechanism connecting the at least three mobile feet to one another and coupled to the chassis of the mobile device, and
  an actuator configured to actuate the linkage mechanism to move the at least three mobile feet to slide between a position bearing against a floor in which the system is able to immobilize the mobile device and a retracted position in which the system is able to free the mobility of the mobile device;
  wherein the linkage mechanism includes at least three sets of links articulated to one another, each set of links of the at least three sets of links being configured to connect one of the at least three mobile feet with the chassis of the mobile device, the linkage mechanism further comprising at least one bar rigidly connected to at least one crossmember, said at least one bar and said at least one crossmember connecting the sets of links and the actuator, wherein actuation of the actuator causes rotation of the links of each set of links of the at least three sets of links relative to one another and thereby sliding of feet in the guides;
  wherein the linkage mechanism includes an actuator disengaging member having a first position in which the actuator disengaging member couples the actuator to the chassis and the linkage mechanism such that the actuator can to apply mechanical forces to the linkage mechanism and a second position in which the disengagement member is configured to disengage the actuator from the chassis and/or the linkage mechanism such that the actuator cannot apply mechanical forces to the linkage mechanism.

20. A system for immobilizing a mobile device comprising:
  a plurality of mobile feet capable of sliding in respective guides, said guides coupled to a chassis of the mobile device,
  a linkage mechanism connecting the at least three mobile feet to one another and coupled to the chassis of the mobile device, and an actuator configured to actuate the linkage mechanism to move the plurality of feet to slide between a position bearing against a floor in which the system is able to immobilize the mobile device and a retracted position in which the system is able to free the mobility of the mobile device;

wherein the linkage mechanism includes a plurality of sets of links articulated to one another, each set of links of the at least three sets of links being configured to connect one of the plurality of mobile feet with the chassis of the mobile device, the linkage mechanism further comprising a bar rigidly connected to a crossmember proximate a midpoint of the bar and a midpoint crossmember, said bar and said crossmember connecting the sets of links and the actuator, wherein actuation of the actuator causes rotation of the links of each set of links of the at least three sets of links relative to one another and thereby sliding of feet in the guides, wherein the bar includes a first end opposite a second end, and wherein one of the plurality of mobile feet is coupled to each of the first end of the bar and the second end of the bar via one of the plurality of links, and wherein the crossmember includes a first end opposite a second end, and wherein one of the plurality of feet is coupled to each of the first end of the crossmember and the second end of the crossmember via one of the plurality of links.

\* \* \* \* \*